United States Patent [19]

Berg

[11] 4,091,877

[45] May 30, 1978

[54] POSITION AND DRAFT CONTROL SUBASSEMBLY AND BRACKET FOR REMOVABLE MOUNTING THEREOF

[75] Inventor: David A. Berg, Milwaukee, Wis.

[73] Assignee: Allis-Chalmers Corporation, Milwaukee, Wis.

[21] Appl. No.: 712,718

[22] Filed: Aug. 9, 1976

[51] Int. Cl.[2] .......... A01B 63/112

[52] U.S. Cl. .......... 172/9

[58] Field of Search .......... 172/7, 9

[56] References Cited

U.S. PATENT DOCUMENTS 3,096,830 7/1963 Criswell et al. .......... 172/9

3,918,527 11/1975 Wagner .......... 172/9

*Primary Examiner*—Richard T. Stouffer

*Attorney, Agent, or Firm*—Arthur L. Nelson

[57] ABSTRACT

A subassembly for use in a position in draft control linkage for operation by cables connected to position and draft control levers. The subassembly includes a mechanical hydraulic valve operating linkage and a position and draft load and sensing linkage sensing position draft and load of the hitch on a tractor. The subassembly is removably mounted as a unit on the vehicle chassis and can be adjusted prior to positioning on the tractor.

10 Claims, 4 Drawing Figures

POSITION AND DRAFT CONTROL SUBASSEMBLY AND BRACKET FOR REMOVABLE MOUNTING THEREOF

This invention relates to a position and draft load control system on a tractor and more particularly to a cable operated subassembly for use in the control system. The subassembly includes a bracket for carrying two cantilever mounted parallel shafts for pivotally supporting a mechanical valve operating linkage and a mechanical feedback signal sensing linkage for controlling the operation of a hydraulic weight distribution valve in response to a position control lever and a draft load control lever operating through the subassembly. Feedback position and draft load signals are applied to the subassembly to control the weight distribution system on the tractor.

Tractors operated with implements often include a hydraulic weight distribution system which operates in response to draft loads. This type of a system senses a draft load preferably in a mechanical manner and generates a signal which in turn controls a hydraulic valve for raising and lowering of the implement responsive to the draft loads. If the draft load is excessive, the signal from the lower draft arms is transmitted through a linkage to open a hydraulic valve and allow pressurized fluid to operate a ram and thereby lift the implement. If the draft load is light, a signal from the lower draft arms is transmitted through a linkage to close the hydraulic valve and allow pressurized fluid to operate a ram and thereby lower the implement. The system controls the implement height in response to draft loads. Theoretically, a constant draft load is maintained on the draft arms of a three point hitch on the tractor even though the soil conditions may vary.

An added refinement to this type of a hitch is provided in a position control linkage which operates in response to the relative position of the implement. A position control linkage may be preset manually to provide a constant depth of the implement which is pulled by the tractor. This in some instances is quite satisfactory even though the soil conditions may vary. Neither one of the systems provides satisfactory operation under all conditions and accordingly a combination of the two systems can provide improved operation and assures satisfactory operating conditions under most all operating circumstances.

The feedback system is usually used to avoid overreacting for some soil conditions. Accordingly, the feedback linkage from the implement position sensing is also transmitted to the linkage operating the hydraulic valve to assure that the draft loading system does not overreact. An adjustment of the feedback systems can also be provided to adjustably vary the compensating reaction of the position control linkage while the draft control linkage is also operating to assure the best operating condition regardless of the soil conditions.

In a modern tractor where the operator station is mounted on a resiliently mounted platform which moves relative to the vehicle chassis, the cable type actuating linkage between the position control and the draft control levers operates more satisfactorily. A typical example of this system is shown in the U.S. Pat. No. 3,918,527.

Accordingly, this invention provides an improved system in which the subassembly including the valve operating linkage and the position and draft load control sensing linkages can be all mounted on a single bracket to form the subassembly. This subassembly can be preassembled and preadjusted before assembly on the tractor. This arrangement simplifies the assembly of the tractor on the assembly line and also provides a means whereby repair of the system can be more easily made and particularly where the subassembly is removed and repaired in the shop.

It is an object of this invention to provide a subassembly for use in a position and draft control system in which the subassembly can be mounted as a unit on the tractor.

It is another object of this invention to provide a subassembly for use in a position and draft load control system in which a bracket carries two cantilever mounted parallel shafts in which the first of said shafts carries a hydraulic valve operating linkage and the second of said parallel shafts carries a position and a draft load control signal sensing linkage for compensating the valve actuation in response to the position or draft load on the vehicle.

It is a further object of this invention to provide a subassembly of a position and draft control system including cable operated hydraulic valve actuating means connected to a position lever and a draft load control lever, and hitch a position feedback signal sensing and draft load signal sensing linkage for compensating the manually controlled cable operators in response to the position and the draft load on the vehicle hitch.

The objects of this invention are accomplished by providing a subassembly including two cantilever supported parallel shafts mounted on a bracket which is adapted for mounting on the vehicle chassis. The first of said shafts carries a valve operating linkage including a first lever which is cable operated through a manually operated position control lever in the position control system of the hydraulic weight distribution system and a second lever which is manually operated through a cable for draft load control lever. A sensing linkage is mounted on the second of said parallel shafts and carries a position signal lever which senses the position of the hitch and a draft load signal sensing lever sensing the draft load on the hitch which are fed into the sensing linkage through cable sheaths to prevent overreaction of the hydraulic weight distribution system under certain conditions.

The subassembly is mounted on a single bracket which can be adjusted in the factory before assembly on the tractor or can be removed from the vehicle as a unit and repaired in the shop without disturbing the other components in the system. This provides a convenient and economical way of servicing the subassembly in the hydraulic weight distribution system.

A preferred embodiment of this invention is illustrated in the attached drawings.

Figure 1:
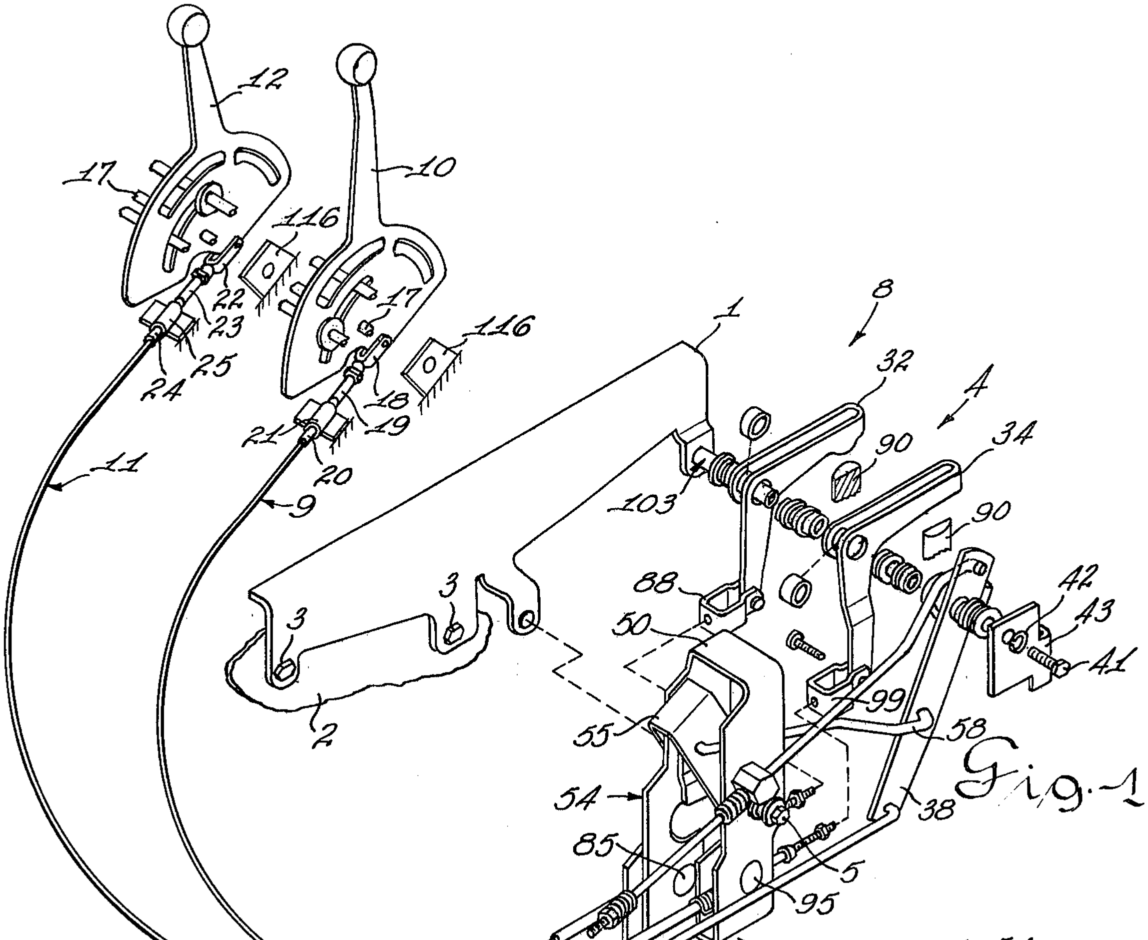
FIG. 1 is a three dimensional view of a position and draft load control system including the subassembly.
Figure 1:
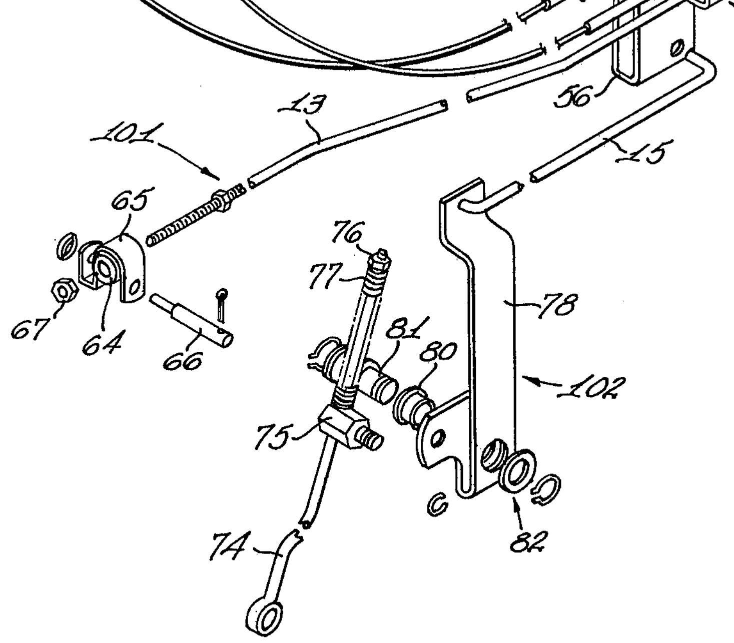
Figure 2:
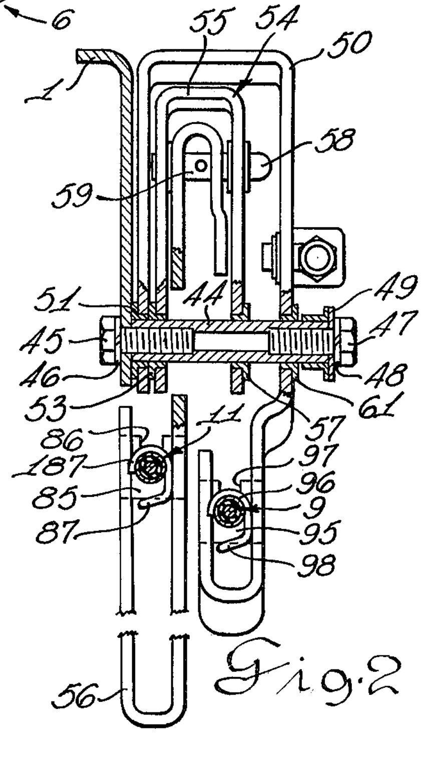
FIG. 2 is a cross-section view taken on line II—II of FIG. 3.

Referring to FIG. 1, an exploded three dimensional view illustrates the position and draft control system.

The subassembly 8 includes the bracket 1 which is mounted on the vehicle chassis 2 by means of a plurality of bolts 3. Two parallel cantilever mounted shaft assemblies are mounted on the bracket 1. The first shaft assembly 103 carries a hydraulic valve operating mechanism 4 and the second shaft assembly 5 carries the feedback signal sensing mechanism 6. The subassembly 8 can be assembled on the tractor as a unit and disassembled as a unit as desired. The subassembly 8 is connected through a position control sheathed cable 9 to a position control lever 10 mounted in the control console of the tractor. The subassembly is also connected through the draft load control cable 11 to the draft load control lever 12 which is pivotally mounted in the control console of the tractor.

Figures 3, 4:
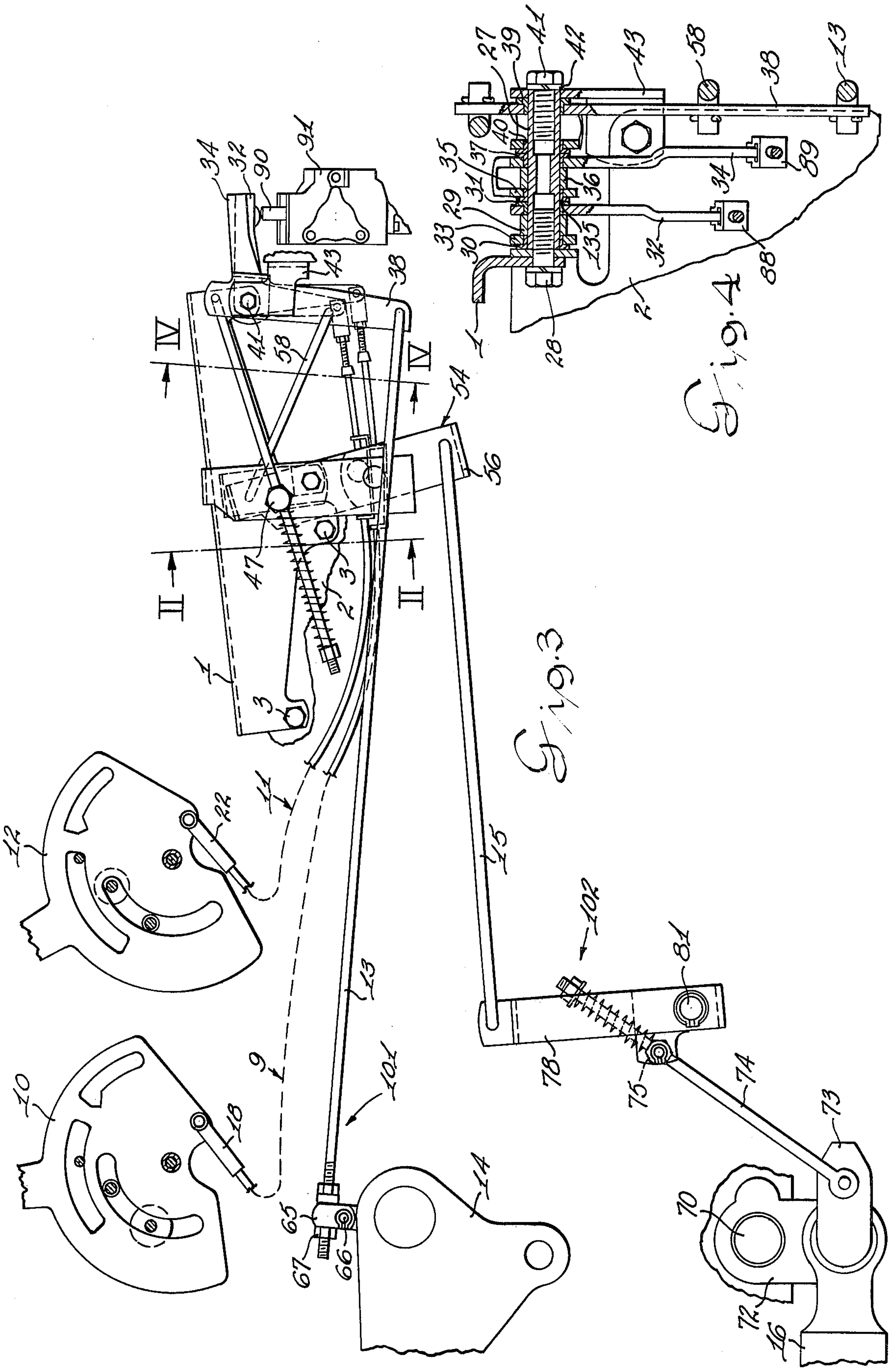
FIG. 3 is a side-elevation view of the position and draft load control system illustrating the subassembly connected between the position and draft load control levers and the hydraulic valve and including the feedback linkages.
FIG. 4 is a cross-section view taken on line IV—IV of FIG. 3.

The subassembly is also connected to the rock arms for controlling the lift links and the position of the vehicle hitch through the position sensing link 13. One of the rock arms 14 is shown in FIG. 3.

The subassembly is also connected through the draft load sensing link 15 which in turn is connected through a linkage to the lower draft arms on a three point hitch of the tractor. One of the lower draft arms 16 is shown in FIG. 3.

The position control lever 10 and the draft load control lever 12 are pivotally mounted on a shaft 17 in a control console 116 which is mounted on a platform at the operator station. The position control lever 10 is pivotally connected to the clevis 18 connected to the cable 19 of the sheathed cable 9. The sheath 20 of the sheathed cable 9 is fastened to the retainer 21 which is supported on the control console. The draft load control lever 12 is also pivotally mounted on the shaft 17 in the control console 116 and is pivotally connected to the clevis 22 which is connected to the cable 23 of the sheathed cable 11. The sheath 24 of the sheathed cable 11 is connected to the retainer 25 which is mounted on the control console.

The sheathed cables 9 and 11 are connected to the subassembly 8. The subassembly 8 includes the bracket 1 which is mounted on the vehicle chassis 2. The valve actuating mechanism 4 is carried on the quill shaft 27 which is cantilever mounted on the bracket 1. The shaft 27 is mounted on the bracket 2 by means of a bolt 28 which threadedly engages the internal periphery of the quill shaft 27. The bushings 29, 30 and 31 embracing the quill shaft 27 rotatably support the draft load control lever 32. The draft load control lever includes a tab 33 which is bent back on the lever to form the second half of the bearing.

The position control lever 34 also has a tab 35 which is bent back on itself to form the second half of the bearing for the lever 34. The lever 34 is pivotally supported on the bushings 135, 36 and 37.

Included in this mechanism is also a feedback lever 38 which is pivotally supported on the bushings 39 and 40. The bolt 41 threadedly engages the internal periphery of the quill shaft 27 and with the lock washer 42 fasten the valve actuating mechanism. The valve support bracket 43 for valve 91 of the hydraulic weight distribution system is mounted in connection with the valve actuating mechanism 4.

The feedback mechanism 6 is cantilever mounted on the bracket 1 as well. The feedback mechanism 6 is mounted on the quill shaft 44 which is fastened by the bolt 45 and lock washer 46. The bolt 45 threadedly engages the internal periphery of the quill shaft 44. Similarly, the bolt 47 and lock washer 48 and washer 49 fasten the feedback mechanism 6 on the other end of the quill shaft. The bolt 47 threadedly engages the inner periphery of the quill shaft 44. The position signal sensing feedback lever 50 is pivotally mounted on the bushings 51 and 61. The draft load signal sensing means includes the articulated lever 54 which includes an upper link 55 and a lower link 56. The upper link 54 is pivotally mounted on the bushings 53 and 57 which embrace the quill shaft 44. The lower link 56 is pivotally connected to the upper link 55 by the rod 58 which has a transverse portion 59 extending through the upper and lower links. The rod 58 is also pivotally connected to the feedback lever 38 which is pivotally mounted on the quill shaft 27.

The links of the articulated lever 54 including the upper and lower links 55 and 56 are nestled within the position control lever 50. All of the levers are provided with two half bearings in which a portion of the lever is bent back 180 degrees to form the second half of the bearing. This arrangement permits the use of a sheet metal lever and also provides for a wide base of pivotal support to maintain alignment of the levers in their operating position.

The position control feedback linkage includes the sleeve 64 retained on the rocker arm 14 by the clamp 65 by means of a pin 66. The nut 67 fastens to the end of the link 13 which is pivotally connected to the feedback lever 38. The rod 58 pivotally connects with the intermediate portion of the lever 38 and is pivotally connected to the articulated lever 54 which also senses a draft load signal. This linkage feeds back a position signal from the rocker arms of a three point hitch on a tractor to compensate for movement of a hitch during actuation of the position control system and also during actuation of the draft control system.

A draft load control signal sensing linkage 102 is operated from the lower draft arms 16 of which one is shown. The torsion bar 70 has one end fixed to the vehicle chassis and the other end is pivotally mounted on the vehicle chassis which has an arm 72 connected to the lower draft arm 16. As the load is applied to the draft arm 16, the arm 72 pivots about the central axis of the torsion bar 70. The ear 73 is connected to the lower draft arm and is pivotally connected to the rod 74. The rod 74 slidably engages the stem 75 through an opening in the stem. The rod 74 extends through the opening and threadedly engages a nut 76 transmitting its force through the spring 77 to the stem 75. The stem 75 is mounted on the lever 78. Lever 78 is pivotally mounted on the bushing 80. Bushing 80 is carried on the shaft 81 of the bearing assembly 82. The bearing assembly 82 is mounted on the vehicle chassis and the lever 78 pivots in response to the movement of the ear 73 connected to the lower draft arm 16. The link 15 is pivotally connected to the lever 78 and in turn connected to the lower link 56 of the articulated lever 54. This provides a draft load signal from the lower draft arms through the feedback linkage 6 to the draft load control lever 32 for operating the hydraulic valve 91.

The subassembly 8 can be assembled on a bench in the shop by mounting the bracket 1 in a manner similar to that for mounting the bracket 1 on the tractor. Cantilever mounted shafts 27 and 44 are mounted on the bracket 1 by means of bolts 28 and 45, respectively. Once the quill shafts 27 and 44 are in position, the bushings, levers and linkages can then be mounted on the shafts to complete the assembly of the valve operating mechanism and the feedback mechanism. The bolts 41 and 47 then are mounted on the end of the shafts to complete the assembly and this assembly then is in position for mounting on the tractor. Any adjustments necessary for the subassembly can be done on the bench before the subassembly is then mounted on the tractor.

Each of the cables 9 and 11 is connected to its respective levers in the assembly. The draft load control cable 11 is positioned between the two arms of the draft load control feedback lever 56 and the trunnion 85 is positioned in the openings of the lever. The cable then, which carries the steel casing with an annular recess, is seated in the slot 86 of the trunnion 85. The spring 87 is then inserted to a position immediately under the trunnion 85 and the spring tabs 187 are extended over the cable to lock the cable in a pivotal manner on the lever 56. The cable 23 extends forwardly through the feedback linkage to connect the clevis 88 of the cable to the draft load control lever 32 which operates on the left portion of the spool 90 of the hydraulic control valve 91.

Sheathed cable 9 extends through the position control feedback lever 50. The trunnion 95 carries the cable 9. The cable 9 is formed with a casing 96 having an annular recess which is received in the slot 97 locking the cable axially in the trunnion 95. A spring 98 is then inserted underneath the trunnion 95 and the spring tabs on each end of the spring extend around the cable to hold the cable pivotally mounted in the lever 50. Cable 19 extends forwardly to connect to the clevis 99 on the position control valve operating lever 34. The position control valve operating lever 34 operates against the right portion of the spool 90 of the hydraulic valve 91.

When the position control lever 10 and the draft load control lever 12 are pivoted in the clockwise direction forwardly on the tractor, neither one of the systems is operating. When the position control lever 10 is rotated to the rear or counterclockwise, the cable 19 is moved forwardly and the position control lever 34 operates the valve spool 90. The relatively constant depth of implement is controlled by the feedback linkage 101 which operates through the feedback lever 50. This in turn moves the sheath 20 of the sheath cable 9 to compensate for movement of the hitch and implement relative to the tractor. This feedback signal is fed into the feedback linkage 6 which in turn is compensated for on the cable 19 in its operation of the position control lever 34.

Similarly, the draft load control lever 12 inactivates the draft load control system when it is moved in the clockwise direction and activates the system when it is moved counterclockwise. The cable 11 has a sheath 24 which is connected to the lower link 56 of lever 54. The draft load control feedback linkage 102 is connected to the lower draft arms and feeds back a signal to the feedback lever 50. This in turn shifts the position of the sheath 24 of the cable 11 and the movement of the sheath 24 moves the draft load control hydraulic valve actuating lever 34 in response to the draft load on the lower draft arm 16. This in turn varies the degree of actuation of the spool 90 in the hydraulic weight distribution system. For a more complete description of a comparable system, reference may be had to U.S. Pat. No. 3,918,527 by Robert J. Wagner.

The embodiments of the invention in which an exclusive property or privilege is claimed are defined as follows:

1. A subassembly in a control mechanism for operating a hydraulic valve in hydraulic weight distribution system of a tractor comprising, a bracket having fastening means adapted for removably mounting said subassembly on a vehicle chassis, a first stub shaft and a second stub shaft mounted in parallel relationship on said bracket, a cantilever support supporting each of said stub shafts by one end on said bracket, a cable operated valve operating mechanism including adjacent levers pivotally mounted on said first stub shaft, a wide bearing on each of said adjacent levers, the total width of said bearings substantially equaling the length of said first stub shaft to stiffen said first stub shaft, a sheathed cable operated sensing mechanism including adjacent levers pivotally mounted on said second stub shaft, a sheathed cable having one end adapted for connection to a position control lever in a control console with the sheath of said cable mounted on the control console, a first lever of said sensing mechanism having a U-shaped bearing forming bearing surfaces in spaced relation on said second stub shaft and a depending operating arm, said U-shaped bearing of said first lever having a width substantially equal to the length of said second stub shaft to stiffen said second stub shaft, means connecting the sheath of the other end of said sheathed cable to the operating arm of said first lever of said sensing mechanism, means connecting the other end of said sheathed cable to a first lever of said valve operating mechanism, a second sheathed cable having one end adapting for connection to a draft control lever and the sheath of the cable mounted on said control console, a second lever of said sensing mechanism having a U-shaped bearing forming bearing surfaces in spaced relation intermediate the bearing surfaces of said first lever on said second stub shaft with a side of each of said U-shaped bearings mounted adjacent the cantilever support of the stub shaft to reduce the bending moment on said second stub shaft, a link pivotally mounted on said second lever and having an operating arm, means connecting the other end of the sheath of said second sheathed cable to said operating arm on the link of said second lever of said sensing mechanism, means connecting the other end of said second sheathed cable to a second lever in said valve operating mechanism, means adapting the first of said levers of said sensing mechanism for connection with a position control feedback linkage adapted for sensing position of a tractor hitch, means adapting said second lever of said sensing mechanism for connection with a draft load control feedback linkage adapted for connection to a draft load member for sensing draft load signals thereby providing a compact subassembly on the control mechanism.

2. A subassembly in a control mechanism adapted for operating a hydraulic valve in a hydraulic weight distribution system of a tractor as set forth in claim 1 wherein said cantilever support for said shafts on said bracket defines a bolt threadedly engaging an end of one of each of said shafts and extending through an opening in said bracket.

3. A subassembly in a control mechanism adapted for operating a hydraulic valve in a hydraulic weight distribution system of a tractor as set forth in claim 1 wherein said levers in said subassembly define sheet metal structure, a tab on each of said levers bent back 180° to form a second half of the bearing of each of said levers.

4. A subassembly in a control mechanism adapted for operating a hydraulic valve in a hydraulic weight distribution system of a tractor as set forth in claim 1 wherein each of said levers defines a portion bent 180° with the lever defining a second half of each of said bearings for each of said levers.

5. A subassembly in a control mechanism adapted for operating a hydraulic valve in a hydraulic weight distribution system of a tractor as set forth in claim 1 wherein said levers in said feedback sensing mechanism includes a first lever forming a U-shaped configuration, the remaining levers of said sensing mechanism defining levers nestled within said first lever to form a compact assembly of said levers in said sensing mechanism.

6. A subassembly in a control mechanism adapted for operating a hydraulic valve in a hydraulic weight distribution system of a tractor as set forth in claim 1 wherein each of said feedback linkages includes means connecting said feedback linkage to a lever connected to one of said cable sheaths to provide feedback to the signal sensing linkage.

7. A subassembly in a control mechanism adapted for operating a hydraulic valve in a hydraulic weight distribution system of a tractor as set forth in claim 1 wherein said shafts define quill shafts, said cantilever support includes means for fastening each of said quill shafts to said bracket, means for fastening the hydraulic valve operating mechanism on the first of said quill shafts, means for fastening the signal sensing mechanism on the second of said quill shafts.

8. A subassembly in a control mechanism adapted for operating a hydraulic valve in a hydraulic weight distribution system of a tractor as set forth in claim 1 including means connecting each of said cable sheaths to their respective sensing lever.

9. A subassembly in a control mechanism adapted for operating a hydraulic valve in a hydraulic weight distribution system of a tractor as set forth in claim 1 where said valve actuating levers in said valve actuating mechanism define levers mounted in side-by-side relationship adapted for operating separate portions of a spool in the hydraulic weight distribution system.

10. A subassembly in a control mechanism adapted for operating a hydraulic valve in a hydraulic weight distribution system of a tractor as set forth in claim 1, said signal sensing mechanism includes a first lever defining a U-shaped configuration pivotally mounted on said second shaft, a second lever defining a U-shaped configuration pivotally mounted on said second shaft encased in said first lever, a third lever pivotally mounted in said second lever pivotally connected with said second lever to thereby provide a nestling of three levers within each other in a compact operating arrangement.

* * * * *